Nov. 16, 1926.
F. R. PEETS
GATE AND OPERATING MECHANISM
Filed Oct. 17, 1924
1,607,558
3 Sheets-Sheet 3
Fig. 4.
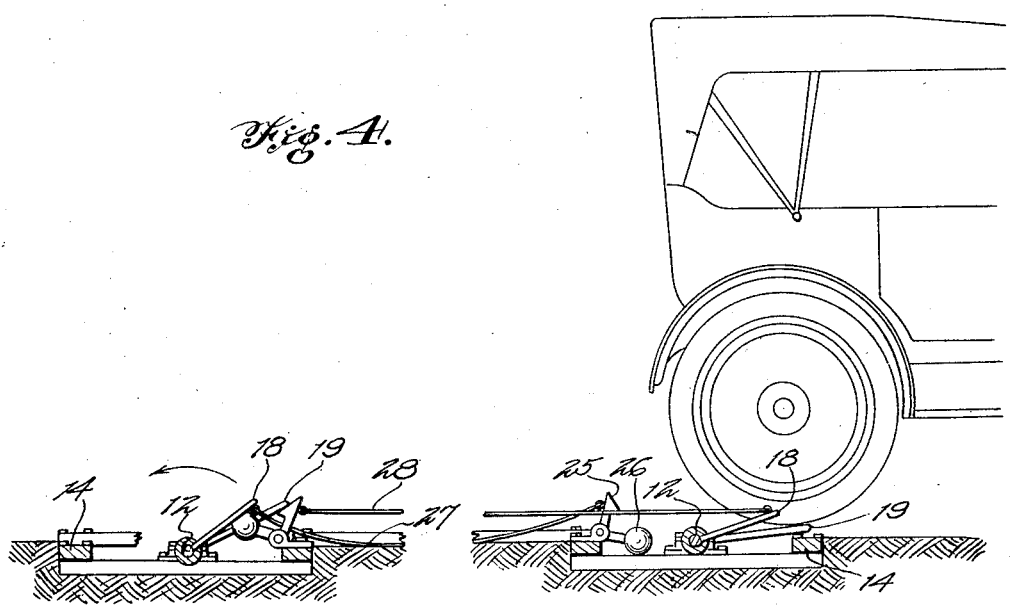
Fig. 5.
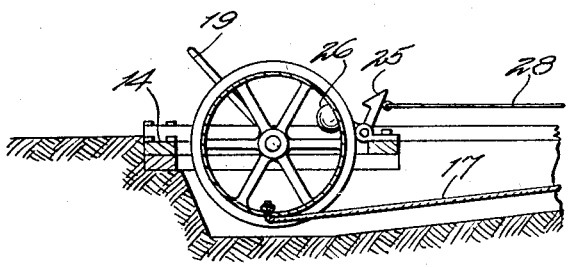
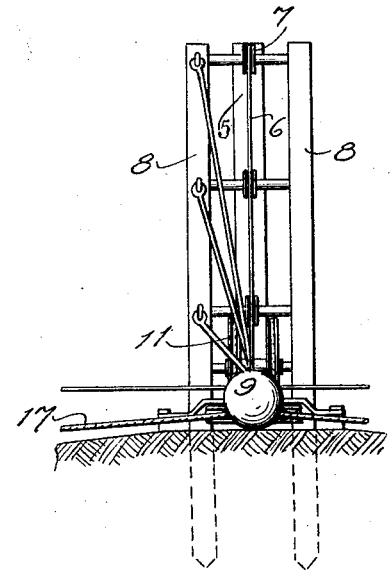
Frank R. Peets
INVENTOR
BY Victor J. Evans
ATTORNEY
WITNESS:
R. E. Wise.

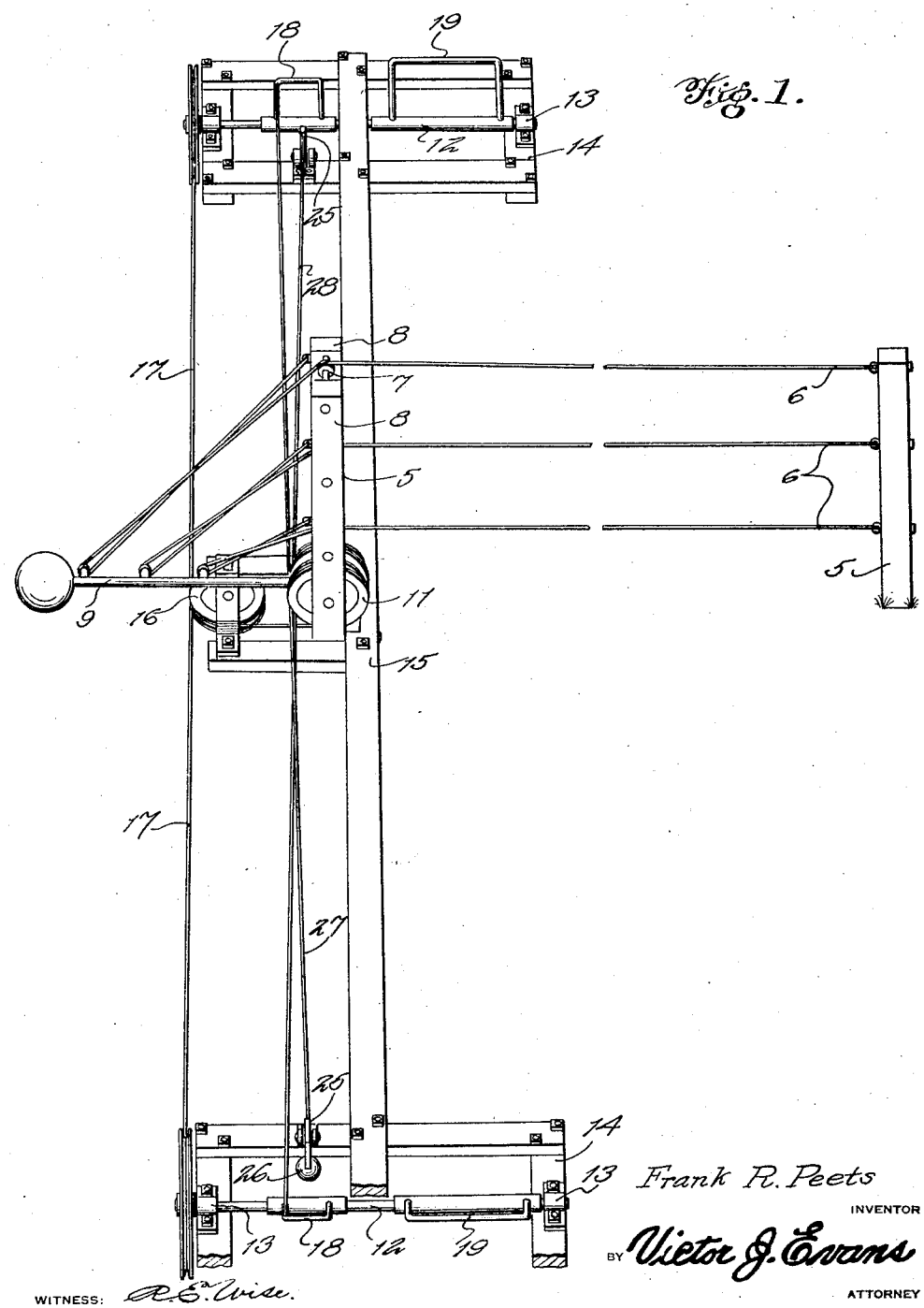

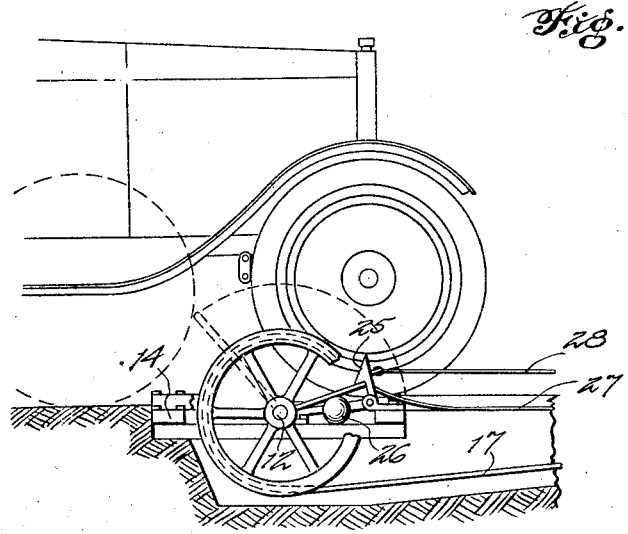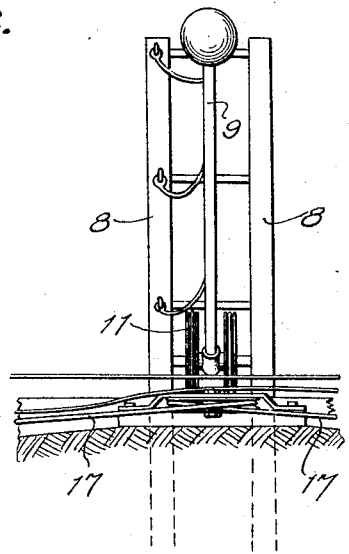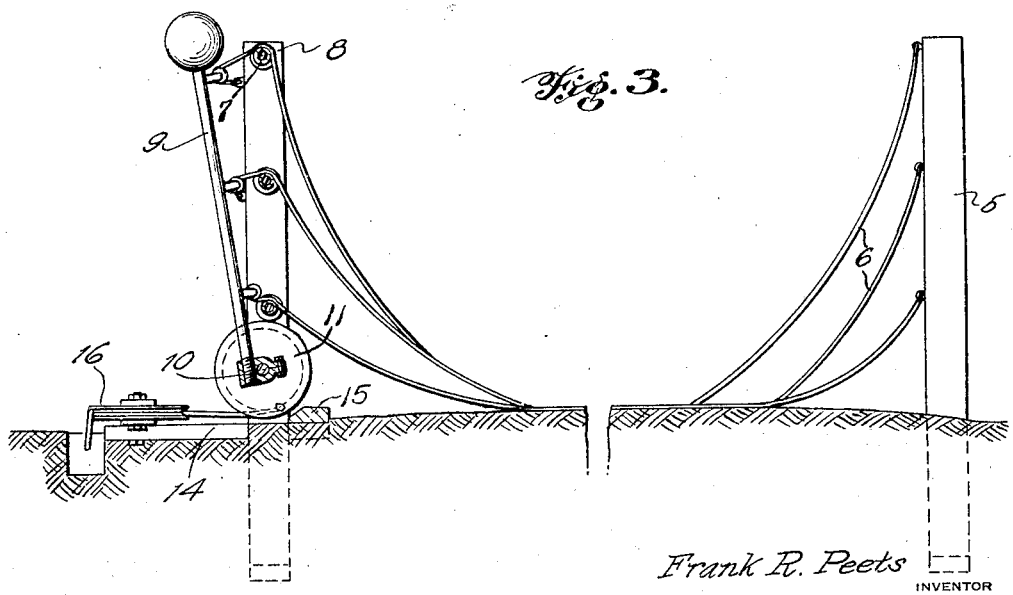

Patented Nov. 16, 1926.

1,607,558

UNITED STATES PATENT OFFICE.

FRANK R. PEETS, OF MERRILL, NEW YORK.

GATE AND OPERATING MECHANISM.

Application filed October 17, 1924. Serial No. 744,205.

This invention relates to a gate and an operating mechanism therefor, and its principal object is to provide a gate and operating mechanism adapted to be actuated by an approaching automobile to open the gate and after the automobile has passed through the gate to automatically close the same.

A further object of the invention is to provide a gate together with means upon opposite sides thereof to be actuated by an approaching automobile to open the gate and after the automobile passes through, the gate will again actuate the mechanism to arrange the gate in closed position.

The invention also contemplates a gate including flexible cross members normally held in a taut position and which are released to lower the same by an approaching automobile and subsequently arranged in a taut position across the gate opening after the automobile has passed through the gate opening.

With the preceding and other objects and advantages in mind, the invention consists in the novel combination of elements, construction and arrangement of parts and operation to be hereinafter specifically referred to, claimed and illustrated in the accompanying drawing, wherein:

Figure 1 is a top plan view of a gate and operating mechanism constructed in accordance with my invention.

Figure 2 is a side elevation of the same showing the gate in the act of being opened by an approaching automobile.

Figure 3 is an elevation showing the gate in an open position, after actuation by an automobile.

Figure 4 is an elevation showing the automobile engaging part of the operating mechanism to close the gate, and Figure 5 is a view partly in section and partly in elevation of the gate and its operating mechanism.

Referring to the drawing in detail wherein corresponding characters of reference denote corresponding parts throughout the several views, the numeral 5 designates a pair of vertically disposed gate posts to one of which a plurality of normally parallel horizontally disposed flexible elements 6 are connected. These flexible elements 6 pass over pulleys 7 supported between vertical uprights 8 which constitute one of the posts 5. The ends of these flexible elements 6 are connected to a weighted lever 9, the latter being carried by a socket 10 fixed to a rotatable drum 11, formed between these uprights 8. As shown in Figure 1 this weighted lever 9 normally assumes a horizontal position and holds the flexible element 6 in a taut position, and in order to release the flexible elements 6 to permit the same to fall to the position shown in Figure 3, I provide a gate actuating mechanism which comprises a rotatable shaft 12 disposed upon the opposite sides of the posts 5 and journaled in bearings 13 formed in a frame structure 14, the latter being arranged upon the ground as shown. Arranged upon a frame 15 to one side of the uprights 8 is a horizontally disposed pulley 16 about which a plurality of flexible elements 17 are engaged, the latter being extended around the drum 11 and attached thereto. These flexible elements 17 extend in opposite directions and have their forward ends engaged around the shafts 12 and attached to suitable drums on one end of the shafts 12.

Also carried by each of the shafts 12 to one side of the yokes 18 and extending at an oblique angle with respect to the horizontal, is a U-shaped actuating element 19 adapted to be engaged by the front wheels of an approaching automobile to rotate the drums and consequently wind the flexible element 17 thereon and through the medium of the connections above described, raise the lever 9 to vertical position to permit the flexible element 6 to drop to the position shown in Figure 3.

In order to hold the counter balanced weight in raised position, and consequently lower the strands 6, I provide pivoted latches 25 and arrange the same on the frames 14 in advance of the U-shaped yokes 18. These pivoted latches 25 are provided with a weight 26 at one end which normally hold the latches in a position where they will engage the U-shaped yokes and consequently hold the shaft against rotation. These latches 25 are connected together by a flexible element 27 while a second flexible element 28 is connected with one of these latches and one of the U-shaped yokes 18.

In the operation of the mechanism an approaching automobile strikes one of the members 18 and thereby rotates the shaft 12 in a forward direction. This operation engages the U-shaped yoke 18 carried by the operated shaft into engagement with its latch element 25 and thereby holds the shaft against retrograde rotation. Due to the forward rotation of the shaft 12, the counterbalanced arm 9 is raised through the medium of the pulley 16 and flexible element 17 and consequently lowers the flexible element 6 to the position shown in Figure 3. After the vehicle passes through the gate opening, one of the rear wheels thereof engaging the operating member 19 of the other shaft 12, to rock the latter in a forward direction, will cause the latch element 25 which has been previously operated to become disengaged from its U-shaped member 18. The counter-balanced lever 9 is then free to fall to a horizontal position throwing the strands 6 across the gate opening.

While I have shown and described the preferred embodiment of the invention, I desire to have it understood that such changes in the construction and arrangement of parts may be made as will not depart from the spirit of the invention or the scope of the subjoined claims.

What is claimed is:—

1. A gate and operating mechanism therefor, comprising a pair of fence posts, a plurality of strands normally secured across the posts, a weighted lever connected with the strands and normally holding the same in a stretched position, vehicle engaging means upon opposite sides of the strands for raising the weighted lever and consequently lowering the strands to the ground, and latch means for holding the strands in inoperative position, and means for releasing said latch means adapted to be actuated by the vehicle after passing through the gate opening, whereby the strands are returned to stretched position.

2. A gate and operating mechanism thereof comprising a pair of spaced gate posts, flexible strands having one end attached to one of the posts, pulleys on the other post, over which the strands pass, a pivoted weighted arm to which the free ends of the flexible strands are attached, rotatable elements upon opposite sides of the posts, vehicle engaging members carried thereby, flexible elements arranged to be wound about the rotatable elements upon actuation of the same by the vehicle, the flexible elements being operatively connected with the weighted arm whereby upon rotation of either of the rotatable elements the weighted arm will be raised and consequently lower the flexible strands, latches arranged adjacent each of the rotatable elements, U-shaped elements carried by the rotatable elements to be engaged by the latches and hold the rotatable elements in inoperative position with the weighted lever in raised position, and a flexible connection between each latch and the opposite rotatable element whereby actuation of a rotatable element by a vehicle after passing through the gate opening, will release the other rotatable element to allow the weighted arm to fall thereby moving the strands to stretched position.

In testimony whereof I affix my signature.

FRANK R. PEETS.